(12) United States Patent
Deardurff

(10) Patent No.: US 7,262,234 B2
(45) Date of Patent: Aug. 28, 2007

(54) PROCESS FOR PREPARING VALUE-ADDED RPET CONTAINING POLYMER BLEND COMPONENT

(75) Inventor: L. Robert Deardurff, Waterville, OH (US)

(73) Assignee: Phoenix Technologies International, LLC, Bowling Green, OH (US)

( * ) Notice: Subject to any disclaimer, the term of this patent is extended or adjusted under 35 U.S.C. 154(b) by 187 days.

(21) Appl. No.: 10/780,494

(22) Filed: Feb. 17, 2004

(65) Prior Publication Data

US 2005/0267282 A1 Dec. 1, 2005

Related U.S. Application Data

(62) Division of application No. 10/386,268, filed on Mar. 11, 2003, now Pat. No. 6,734,234.

(51) Int. Cl.
*C08G 63/02* (2006.01)

(52) U.S. Cl. .............. 524/81; 524/48.81; 524/401; 524/411; 524/412; 525/166; 525/176; 525/444; 528/271; 528/272

(58) Field of Classification Search ........... 524/48, 524/81, 401, 411, 412; 525/166, 176, 444; 528/271, 272
See application file for complete search history.

(56) References Cited

U.S. PATENT DOCUMENTS

| | | |
|---|---|---|
| 5,075,057 A | 12/1991 | Hoedl |
| 5,565,158 A | 10/1996 | Sullivan et al. |
| 6,479,003 B1 | 11/2002 | Furgiuele et al. |

*Primary Examiner*—Terressa Boykin
(74) *Attorney, Agent, or Firm*—Fraser Clemens; Martin & Miller LLC; Donald R. Fraser

(57) ABSTRACT

A process for preparing an RPET polymer blend component comprises providing a quantity of RPET flakes, comminuting the RPET flakes to prepare RPET particles having an average mean particle size from about 500 microns to about 5 microns, adding at least one specialty additive to the RPET particles, and mixing the RPET particles and specialty additive, to prepare a homogeneous blend of RPET carrier and specialty additive.

9 Claims, No Drawings

PROCESS FOR PREPARING VALUE-ADDED RPET CONTAINING POLYMER BLEND COMPONENT

RELATED APPLICATIONS

This is a Divisional of U.S. patent application Ser. No. 10/386,268 filed Mar. 11, 2003 now U.S. Pat. No. 6,734,234.

FIELD OF THE INVENTION

This invention relates generally to a process for preparing a value-added recycled polyethylene terephthalate (RPET) polymer blend component. More particularly, the invention is directed to a process for combining post-consumer polyethylene terephthalate and a specialty additive, to produce a polymer blend component that is useful and desirable for the manufacture of new products.

BACKGROUND OF THE INVENTION

Post-consumer processing of recycled PET to manufacture a variety of low-tech consumer products such as flowerpots and fence posts is well-known. Typically, the recycling process utilizes used PET containers, such as discarded carbonated beverage containers, which are collected, sorted, washed, and separated from contaminants to yield a relatively clean source of RPET. Additionally, the manufacture of imperfect and damaged molded PET products, particularly the blow molded bottles used for containing consumer goods, results in a considerable amount of PET waste, which the manufacturers of such products would like to reuse. The RPET produced by conventional recycling processes is generally in ground or flake form, which is thereafter melt processed or further pelletized by the end user.

RPET is generally subjected to a grinding operation in order to make the material easier to handle and process. Conventional grinding equipment reduces the RPET to about ⅜ inch particles or flakes. The grinding is conducted in a manner to insure that a consistent flake size will be produced, by employing a grate or screen through which the ground material must pass upon exiting the grinder. Although conventional RPET flakes melt processing and pelletizing equipment is designed to handle ⅜ inch flakes, some RPET materials having sizes as large as M inch and as small as ¼ inch are also commercially produced. The bulk density of ⅜ inch flake RPET generally ranges from about 22 to about 35 pounds per cubic foot.

Similarly, RPET and PET pellets are generally formed to a standard, uniform size of about 0.12 inch in diameter. The bulk density of such pellets generally ranges from about 50 to about 58 pounds per cubic foot. Typically, PET and RPET melt processing equipment is designed to accept pellets having the above-mentioned dimensions and physical characteristics.

Regrettably, RPET flakes are difficult to process when combined with specialty additives and other polymeric materials. For example, RPET flakes and specialty additives do not easily result in a homogeneous material when mechanically mixed together, and thus are incompatible with virgin plastic particles in subsequent melting and forming processes.

It would be desirable to prepare an RPET polymer blend component, comprising RPET and a specialty additive, which blend component is beneficial and easily processed when combined with other polymeric materials in subsequent melting and forming operations.

SUMMARY OF THE INVENTION

Accordant with the present invention, a process for preparing an RPET polymer blend component, including an RPET carrier and a specialty additive, has surprisingly been discovered. The process comprises providing a quantity of RPET flakes, comminuting the RPET flakes to prepare RPET particles having an average mean particle size from about 500 microns to about 5 microns, adding a specialty additive to the RPET particles, and mixing the RPET particles and specialty additive, to prepare a homogeneous blend of RPET carrier and specialty additive.

The inventive process is particularly useful for preparing a value-added RPET polymer blend component, comprising a specialty additive and an RPET carrier, which may thereafter be blended with additional polymeric materials for the melt processing and forming of, for example, plastic containers.

DETAILED DESCRIPTION OF THE PREFERRED EMBODIMENT

The present invention is directed to a process for preparing an RPET polymer blend component, including an RPET carrier and a specialty additive, comprising providing a quantity of RPET flakes, comminuting the RPET flakes to prepare RPET particles having an average mean particle size from about 500 microns to about 5 microns, adding a specialty additive to the RPET particles, and mixing the RPET particles and specialty additive, to prepare a homogeneous blend of RPET carrier and specialty additive.

By the term "RPET flakes" as it is used herein is meant generally the commercially available recycled polyethylene terephthalate materials produced by conventional PET recycling methods, usually in flake form, but which may additionally be in the form of chunks, spheres, pellets, and the like, and which are generally made available in bulk in a substantially uniform particle size from about ¼ inch to about ½ inch.

According to the present invention, a quantity of RPET flakes is provided for further processing. Since the RPET flakes will ultimately be formed into a carrier for dispersing and aiding in the efficacy of the specialty additive, the quantity of RPET flakes provided in the initial step of the inventive process may easily be determined by a routineer in the art of polymer processing.

According to the present invention, the RPET flakes are comminuted by any conventional means to prepare RPET particles having an average mean particle size from about 500 microns to about 50 microns. Preferably, the RPET particles have an average mean particle size from about 300 microns to about 15 microns.

Following comminution of the RPET flakes, the resultant RPET particles are added together with one or more specialty additives useful for enhancing the processing or properties of an ultimately-produced plastic article. Examples of well-known specialty additives useful for practicing the present invention include, but are not necessarily limited to, colorants, toners, dyes, ultraviolet blocking agents, oxygen scavengers, gas diffusion barrier agents, antioxidants, acetylaldehyde reduction additives, slip agents, lubricants, fillers, and the like, as well as mixtures thereof.

Finally, the RPET particles and specialty additive are thoroughly mixed together, utilizing conventional mixing equipment, to form a polymer blend component comprising an RPET carrier and a specialty additive. This polymer blend component is beneficial for combining with other polymer materials for subsequent melt processing and forming operations. For example, the addition of the inventive RPET polymer blend component to a quantity of virgin polyethylene terephthalate will extend the virgin PET, and facilitate the intimate mixing of the specialty additive with the polymer mass.

The inventive RPET polymer blend component of the present invention may be pelletized, for subsequent addition to other polymer pellets. Alternatively, the polymer blend component may be mixed directly with other polymeric materials for further processing. Examples of other polymers with which the inventive RPET polymer blend component may be combined for further processing include, but are not necessarily limited to, polyethylene terephthalate (PET), polystyrene, polyacrylate, polymethylmethacrylate, polyvinyl chloride, polyacrylonitrile, polyvinyl acetate, polyvinyl alcohol, polyolefin, polyester, polycarbonate, polyether, polyamide, and the like, as well as derivatives, blends, and copolymers thereof.

The RPET polymer blend component according to the present invention exhibits a number of advantages over the carrier and specialty additive blends of the prior art. Since RPET it typically incorporated in a virgin polymer blend at a minimum level of about ten percent, the inventive polymer blend component provides a much better additive-to-virgin-blend ratio in an injection molding operation, thereby providing a more homogeneous dispersion of the additive. If the inventive polymer blend component is pelletized before it is blended with virgin resin, then the additive encounters two plastication operations (the polymer blend component pelletization and compounding with the virgin resin); thus, the blending and dispersion of the additive is inherently improved. Utilizing the inventive process allows the additive to be dispensed at a higher and more accurately controlled concentration in the palletizing operation, thus providing more consistency to the final blend. Incorporation of the inventive polymer blend component at the palletizing operation also eliminates the need for additive blenders on the injection machines used to produce, for example, a container preform, thus reducing the complexity of that operation. Since RPET extrusion systems are designed to blend different grades of PET, they cause more effective mixing than the injection molding extrusion systems used to form the ultimate preform or plastic article. Accordingly, the incorporation of the inventive polymer blend component into conventional RPET extrusion systems insures thorough, homogeneous mixing of the specialty additive.

The process for preparing an RPET polymer blend component described hereinabove is generally disclosed in terms of its broadest application to the practice of the present invention. Occasionally, the process conditions as described may not be precisely applicable to each RPET particle and specialty additive combination included within the disclosed scope. Those instances where this occurs, however, will be readily recognized by those ordinarily skilled in the art. In all such cases, the process may be successfully performed by conventional modifications to the disclosed procedures.

The invention is more easily comprehended by reference to specific embodiments recited hereinabove, which are representative of the invention. It must be understood, however, that the specific embodiments are provided only for the purpose of illustration, and that the invention may be practiced otherwise than as specifically illustrated without departing from its spirit and scope.

What is claimed is:

1. A process for preparing an RPET polymer blend component, including an RPET carrier and a specialty additive, comprising:
    providing a quantity of RPET particles having an average mean particle size from about 500 microns to about 5 microns;
    adding a specialty additive to the RPET particles;
    mixing the RPET particles and specialty additive, to prepare a homogeneous blend of RPET carrier and specialty additive; and
    mixing the homogeneous blend with a resin to dilute the specialty additive to a desired consistency.

2. The process for preparing an RPET polymer blend component according to claim 1, wherein the average mean particle size of the RPET particles ranges from about 300 microns to about 15 microns.

3. The process for preparing an RPET polymer blend component according to claim 1, wherein the specialty additive is selected from the group consisting of colorants, toners, dyes, ultraviolet blocking agents, oxygen scavengers, gas diffusion barrier agents, antioxidants, acetylaldehyde reduction additives, slip agents, lubricants, fillers, and mixtures thereof.

4. A process for preparing an RPET polymer blend component, including an RPET carrier and a specialty additive, comprising:
    providing RPET particles having an average mean particle size from about 500 microns to about 5 microns;
    adding a specialty additive to the RPET particles, said specialty additive selected from the group consisting of colorants, toners, dyes, ultraviolet blocking agents, oxygen scavengers, gas diffusion barrier agents, antioxidants, acetylaldehyde reduction additives, slip agents, lubricants, fillers, and mixtures thereof;
    mixing the RPET particles and specialty additive, to prepare a homogeneous blend of RPET carrier and specialty additive; and
    mixing the homogeneous blend with a resin to dilute the specialty additive to a desired consistency.

5. The process for preparing an RPET polymer blend component according to claim 4, wherein the average mean particle size of the RPET particles ranges from about 300 microns to about 15 microns.

6. The process for preparing an RPET polymer blend component according to claim 1, wherein the resin is one of virgin PET and recycled resin.

7. The process for preparing an RPET polymer blend component according to claim 1, further including the step of melt processing the homogenous blend prior to being mixed with the resin.

8. The process for preparing an RPET polymer blend component according to claim 4, wherein the resin is one of virgin PET and recycled resin.

9. The process for preparing an RPET polymer blend component according to claim 4, further including the step of melt processing the homogenous blend prior to being mixed with the resin.

* * * * *